Nov. 4, 1958 W. H. SCHMELING 2,859,357
CONTROL CIRCUIT FOR PARALLEL GENERATORS
Filed May 23, 1956
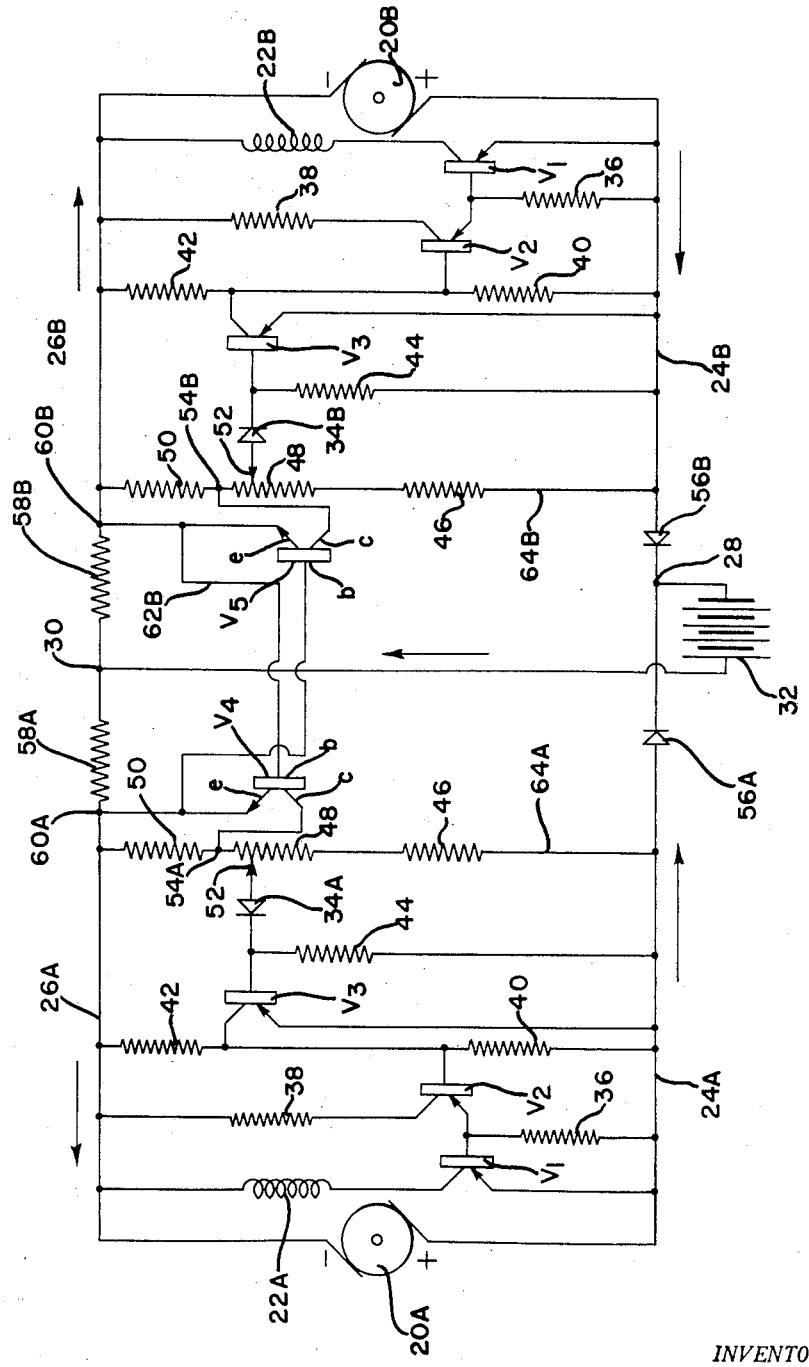
INVENTOR.
William H. Schmeling
BY John T. Marvin
His Attorney

United States Patent Office 2,859,357
Patented Nov. 4, 1958

2,859,357

CONTROL CIRCUIT FOR PARALLEL GENERATORS

William H. Schmeling, Dayton, Ohio, assignor to General Motors Corporation, Detroit, Mich., a corporation of Delaware Application May 23, 1956, Serial No. 586,743

5 Claims. (Cl. 307—57)

This invention relates to voltage regulation of direct current generators and more particularly to a method and circuit network to individually control the output voltages of two D. C. generators that are connected for parallel operation.

It is an object of the present invention to individually control the fields of two D. C. generators that are connected in parallel so the outputs of the generators will be substantially equal.

Another object of the present invention is to individually control the field currents of two D. C. generators with separate transistorized voltage regulators and to interconnect the regulators through a transistor so the output of the generators will be substantially equal when the generators are connected for parallel operation.

In carrying out the above objects it is another object of the present invention to vary the control of a voltage regulator on the field of a D. C. generator by a means that includes at least one transistor that is made conductive whenever the output of one generator is different from the output of another generator which is connected for parallel operation with the first generator.

A still further object of the present invention is to maintain the output of at least two D. C. generators substantially equal when the generators are connected in parallel to supply a common direct current circuit with power. This object is accomplished by individually controlling the shunt fields of the generators with individual voltage regulators that include a voltage divider, a voltage sensitive diode and transistors and to interconnect the voltage regulators through transistors that are responsive to the voltage drop across a pair of line resistances in the common direct current circuit.

Further objects and advantages of the present invention will be apparent from the following description, reference being had to the accompanying drawings, wherein a preferred embodiment of the present invention is clearly shown.

In the drawings, the single figure diagrammatically shows a form of a circuit network according to the present invention.

In the drawings a pair of D. C. generators 20A and 20B are shown, each of which have shunt fields 22A and 22B. The generators 20A and 20B each have their output terminals connected through leads 24A, 24B, 26A and 26B to junctions 28 and 30, respectively, to supply a common direct current load circuit which may include a storage battery 32. Connected across the leads 24A and 26A in the case of generator 20A and leads 24B and 26B in the case of generator 20B are individual transistorized voltage regulators which include the zener type silicon diodes 34A and 34B. The remaining components of the transistorized voltage regulator which includes the transistors $V_1$, $V_2$, $V_3$ resistances 36, 38, 40, 42 and 44 along with the voltage divider which includes resistances 46, 48 and 50 and taps 52 are all connected to function as set forth in patent application Serial No. 546,503 which has been assigned to the assignee of the present invention.

This voltage regulating means will vary the current flow in fields 22A and 22B inversely with the voltage between leads 24A and 24B, and 26A and 26B, respectively, as is reflected by the voltage impressed across the diode 34A and 34B. The voltage drop across the diodes 34A and 34B is determined by the setting of the taps 52 and the outputs of the generators 20A and 20B. From the above and as set forth in the application supra it will be apparent that the strength of the current in fields 22A and 22B will vary inversely with the voltage impressed across the diodes 34A and 34B.

The paralleling circuit for the two D. C. generators 20A and 20B will now be described. The transistors $V_4$ and $V_5$ as used in the paralleling circuit are of the NPN type, while the transistors $V_1$, $V_2$ and $V_3$ as used in the voltage regulator circuits are of the PNP type. The NPN type transistors operate as follows: When the base $b$ of a NPN transistor is positive with respect to the emitter $e$, current will flow from the collector $c$ to the emitter $e$ providing the collector $c$ is positive with respect to the emitter $e$.

The transistor $V_4$ has its collector $c$ connected to junction 54A. This junction 54A is located between resistances 48 and 50 on the voltage divider connected with generator 20A. The collector of transistor $V_5$ is connected to the junction 54B which is located between resistances 48 and 50 on the voltage divider connected with generator 20B. The junctions 54A and 54B are always more positive than leads 26A and 26B, respectively, which are in direct connection with the emitters $e$ of transistors $V_4$ and $V_5$, respectively. Consequently, the conduction of each of the transistors $V_4$ and $V_5$ is a function of the polarity of their respective bases with respect to their emitters. In connection with the paralleling circuit the silicon diodes 56A and 56B are included in the lead 24A and 24B, respectively, to prevent the discharge of the battery 32 through the paralleling circuit, the voltage regulating circuit and the generators when the generator output is insufficient to charge the battery. Further these diodes will permit one of the generators to operate while the other may be idle and will prevent the paralleling circuit from operating until the generator with which it is associated has reached a predetermined output. The paralleling circuit also includes a pair of resistances 58A and 58B which are connected in leads 26A as shown. The function of these resistances will become hereinafter apparent.

The operation of the paralleling circuit is as follows: Assume the generator 20A is set to operate at a higher voltage than the generator 20B. When this condition occurs current flow in lines 24A and 26A will be greater than the current flow in lines 24B and 26B and will be in the direction indicated by the arrows as we assume the current flow from positive to negative. When this occurs, the voltage drop across resistance 58A will be greater than the voltage drop across 58B. This current flow and voltage drop across resistances 58 will make the junction 60A more negative than the junction 60B or it can be stated that junction 60B is positive with respect to junction 60A. The junction 60A and 60B respectively are located in leads 26A and 26B respectively, on the negative sides of the resistances 58A and 58B as shown. The junction 60B is connected through lead 62B with the base $b$ of transistor $V_4$. The junction 60A is connected to the emitter $e$ of transistor $V_4$. Thus the base of the transistor $V_4$ will be positive with respect to its emitter and transistor $V_4$ will conduct. When the transistor $V_4$ conducts, the resistance 50 will be partially shorted from the circuit which includes lead 64A. This will cause the voltage drop across 46 and 48 to be increased. When the voltage drop across 46 and 48 is increased, the voltage drop across diode 34A is correspondingly increased and the conduction of diode 34A is increased. This will cause a decrease in energization of field 22A and the output of generator 20A will be decreased until its output approaches the output of generator 20B. When this occurs the voltage drop difference between resistors 58A and 58B will be reduced and the conduction of transistor $V_4$ will be correspondingly reduced until a steady state or balanced condition is established.

While transistor $V_4$ is conducting, transistor $V_5$ will not be conductive because the base $b$ which is connected to junction 60A will be negative relative to its emitter which is connected to junction 60B. When the generator 20B is set to operate at a higher voltage than generator 20A, then transistor $V_5$ will be conductive in the same fashion as transistor $V_4$. In this instance the output of the generator 20B will be reduced until a steady state or balanced condition is established.

While the embodiment of the present invention as herein disclosed, constitutes a preferred form, it is to be understood that other forms might be adopted.

What is claimed is as follows:

1. A circuit network for equalizing the output of at least two D. C. generators each having a shunt field winding and output terminals connected to a common circuit for parallel operation comprising; a voltage regulator for each generator including a voltage sensitive diode connected in circuit with said output terminals and the field of the generator which the regulator controls, and a means including a transistor connected in circuit with the diode and said common circuit for increasing and decreasing the voltage drop across said diode in response to a predetermined output difference of said generators.

2. A paralleling circuit for at least two D. C. generators each having a shunt field winding controlled by a transistorized circuit that includes a voltage sensitive diode comprising; a pair of resistances connected in circuit with both generators and a pair of transistors each connected in circuit with a diode and both of which are connected in circuit with both resistances for selectively controlling the voltage across said diodes in response to current flow in said resistances.

3. In a paralleling circuit for two D. C. generators having output terminals connected through a junction for parallel operation to a common D. C. load including a storage battery, wherein each of the generators has a shunt field winding controlled by a transistorized circuit that includes a voltage sensitive diode, the combination comprising; a resistance in the output circuit of each generator between said output terminals and junction, a transistor in circuit with the resistors of both generators and in circuit with the diode of one of said generators for varying the voltage across said diode in response to current flow in said resistances and a diode in each of said generator to battery circuits for preventing current flow from said battery to generator when the output of either of the generators is insufficient to charge said battery.

4. A paralleling circuit for first and second direct current generators each having a shunt field winding comprising; first conductor means connecting one side of each of said generators together, second conductor means connecting the opposite sides of said generators together, first and second resistors connected in series with said first conductor means and having a common junction, a load circuit connected between said common junction and said second conductor means, first and second transistors each having base, emitter and collector electrodes, means connecting the emitter electrodes of said first and second transistors respectively with one side of said first and second resistors opposite the junction side thereof, means connecting the base electrode of said first transistor with the side of the second resistor opposite the junction side, means connecting the base electrode of said second transistor with the side of said first resistor opposite the junction side, means connecting the emitter-collector circuits of said transistors in parallel and across said first and second conductor means, a first means connected through an electric circuit with the emitter-collector circuit of said first transistor and with the shunt field winding of said first generator for controlling a current flow through said field winding as a function of emitter-collector circuit conductance of said first transistor, and a second means connected through an electric circuit with the emitter-collector circuit of said second transistor and with the shunt field winding of said second generator for controlling a current flow through said field winding as a function of emitter-collector circuit conductance of said second transistor.

5. A paralleling circuit for first and second direct current generators each having a shunt field winding comprising, first conductor means connecting one side of each of said generators together, second conductor means connecting the opposite sides of said generators together, first and second resistors connected in series with said first conductor means and having a common junction, a load circuit connected between said common junction and said second conductor means, first and second transistors each having base, emitter and collector electrodes, means connecting the emitter-collector circuit of said first transistor between the side of said first resistor opposite the junction side thereof and said second conductor means, means connecting the emitter-collector circuit of said second transistor between the side of said second resistor opposite the junction side thereof and said second conductor means, means connecting the base electrode of said first transistor with the side of the second resistor opposite the junction side, means connecting the base electrode of said second transistor with the side of said first resistor opposite the junction side, a first means connected through an electric circuit with the emitter-collector circuit of said first transistor and with the shunt field winding of said first generator for controlling current flow through said field winding as a function of emitter-collector circuit conductance of said first transistor, and a second means connected through an electric circuit with the emitter-collector circuit of said second transistor and with the shunt field winding of said second generator for controlling current flow through said field winding as a function of emitter-collector circuit conductance of said second transistor.

No references cited.